(12) United States Patent
Inoue et al.

(10) Patent No.: US 9,354,333 B2
(45) Date of Patent: May 31, 2016

(54) RADIATION DETECTION APPARATUS AND IMAGING SYSTEM

(71) Applicant: CANON KABUSHIKI KAISHA, Tokyo (JP)

(72) Inventors: Masato Inoue, Kumagaya (JP); Shinichi Takeda, Honjo (JP); Satoru Sawada, Fujioka (JP); Takamasa Ishii, Honjo (JP); Taiki Takei, Okegawa (JP); Kota Nishibe, Honjo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 51 days.

(21) Appl. No.: 13/901,629

(22) Filed: May 24, 2013

(65) Prior Publication Data

US 2013/0341517 A1 Dec. 26, 2013

(30) Foreign Application Priority Data

Jun. 20, 2012 (JP) ................................. 2012-139160

(51) Int. Cl.
*G01T 1/20* (2006.01)
*G01T 7/00* (2006.01)

(52) U.S. Cl.
CPC ... *G01T 7/00* (2013.01); *G01T 1/20* (2013.01); *G01T 1/2006* (2013.01)

(58) Field of Classification Search
CPC ............. G01T 7/00; G01T 1/20; G01T 1/2006
See application file for complete search history.

(56) References Cited

U.S. PATENT DOCUMENTS

| 6,825,472 | B2 * | 11/2004 | Endo ......................... 250/370.09 |
| 7,256,404 | B2 | 8/2007 | Inoue et al. ............... 250/370.11 |
| 7,391,029 | B2 | 6/2008 | Takeda et al. ............. 250/370.11 |
| 7,435,967 | B2 * | 10/2008 | Ertel et al. ................ 250/370.11 |
| 7,514,686 | B2 | 4/2009 | Ogawa et al. ............. 250/361 R |
| 7,535,506 | B2 | 5/2009 | Nomura et al. ............... 348/308 |
| 7,692,152 | B2 | 4/2010 | Inoue ......................... 250/361 R |

(Continued)

FOREIGN PATENT DOCUMENTS

| CN | 101385648 | 3/2009 |
| EP | 1253442 | 10/2002 |

(Continued)

OTHER PUBLICATIONS

Machine Translation of JP 2012-052881.*

(Continued)

*Primary Examiner* — Yara B Green
(74) *Attorney, Agent, or Firm* — Fitzpatrick, Cella, Harper & Scinto

(57) ABSTRACT

A radiation detection apparatus, comprising a housing including a first plate portion and a second plate portion arranged to face each other, a scintillator configured to convert radiation into light, supported by a supporting portion arranged in a side of the second plate portion in the housing, a sensor panel including a sensor array in which a plurality of sensors for detecting light are arrayed, interposed between the scintillator and the first plate portion in the housing, and a member interposed between the first plate portion and the sensor panel in the housing, wherein the sensor panel is arranged to position an outer edge of the sensor panel outside an outer edge of the scintillator, and the member is arranged to position an outer edge of the member inside the outer edge of the scintillator.

18 Claims, 3 Drawing Sheets

(56) References Cited

U.S. PATENT DOCUMENTS

| | | | |
|---|---|---|---|
| 7,714,294 B2 | 5/2010 | Sawada et al. | 250/370.11 |
| 7,723,693 B2 | 5/2010 | Okada et al. | 250/370.01 |
| 7,777,167 B2 | 8/2010 | Takeda et al. | 250/205 |
| 7,897,930 B2 | 3/2011 | Mochizuki et al. | 250/370.09 |
| 7,952,058 B2 | 5/2011 | Nomura et al. | 250/208.1 |
| 8,115,177 B2 | 2/2012 | Takeda et al. | 250/370.11 |
| 8,304,735 B2 | 11/2012 | Inoue et al. | 250/361 R |
| 8,368,027 B2 | 2/2013 | Ishii et al. | 250/370.08 |
| 8,440,975 B2 | 5/2013 | Inoue et al. | 250/363.01 |
| 2004/0211911 A1* | 10/2004 | Hata | 250/370.11 |
| 2006/0033040 A1* | 2/2006 | Okada et al. | 250/484.2 |
| 2008/0217550 A1 | 9/2008 | Shoji et al. | 250/370.11 |
| 2009/0065703 A1 | 3/2009 | Jadrich et al. | 250/370.11 |
| 2011/0315886 A1 | 12/2011 | Sawada et al. | 250/366 |
| 2012/0126126 A1 | 5/2012 | Yokoyama et al. | 250/366 |
| 2013/0020493 A1 | 1/2013 | Ishii et al. | 250/394 |
| 2013/0134312 A1 | 5/2013 | Nagano et al. | 250/363.01 |
| 2013/0134316 A1 | 5/2013 | Nakatsugawa et al. | 250/366 |
| 2013/0187054 A1 | 7/2013 | Ishii et al. | 250/367 |
| 2013/0221198 A1 | 8/2013 | Sawada et al. | 250/208.1 |

FOREIGN PATENT DOCUMENTS

| | | |
|---|---|---|
| JP | 2010-127882 | 6/2010 |
| JP | 2010-262134 | 11/2010 |
| JP | 2012-052881 * | 3/2012 |
| WO | 2012/029385 A | 3/2012 |

OTHER PUBLICATIONS

Office Action issued on Mar. 2, 2015 in counterpart P.R. China Patent Application No. 201310237626.X, with translation.

Japanese Office Action issued Mar. 25, 2016 in counterpart application JP 2012-139160, with translation.

* cited by examiner

RADIATION DETECTION APPARATUS AND IMAGING SYSTEM

BACKGROUND OF THE INVENTION

1. Field of the Invention

The present invention relates to a radiation detection apparatus and imaging system.

2. Description of the Related Art

A radiation detection apparatus can include a scintillator which converts radiation into light, and a sensor panel which detects the light. Recently, a back-side irradiation radiation detection apparatus has been examined, in which radiation is emitted from a side of the sensor panel opposite to a side on which the scintillator is arranged, as disclosed in Japanese Patent Laid-Open No. 2010-262134. A radiation detection apparatus of this type needs to resist an externally applied load. For example, when the radiation detection apparatus is used while a subject to be examined (for example, a patient) lies down on it, the radiation detection apparatus should be designed to satisfactorily stand his weight.

FIG. 3 schematically shows the structure of a back-side irradiation radiation detection apparatus D1. The radiation detection apparatus D1 includes, for example, a housing 10, scintillator 20, and sensor panel 30. The scintillator 20 may be covered with a protection layer. The scintillator 20 is supported by a supporting portion 40 arranged on the side of a plate portion 12 in the housing 10. The sensor panel 30 is interposed between a plate portion 11 and the scintillator 20.

In order to arrange a peripheral circuit, electrode, and the like, the sensor panel 30 is larger in dimensions than the scintillator 20, and has a portion P where the sensor panel 30 and scintillator 20 do not contact each other. In this structure, a stress can be applied to the portion P of the sensor panel 30 owing to an externally applied load mentioned above, damaging the sensor panel 30.

SUMMARY OF THE INVENTION

The present invention has been made in recognition of the above problem by the inventor. One of the aspects of the present invention provides a technique advantageous for improving the reliability of a radiation detection apparatus.

One of the aspects of the present invention provides a radiation detection apparatus, comprising a housing including a first plate portion and a second plate portion which are arranged to face each other, a scintillator configured to convert radiation into light, which is supported by a supporting portion arranged in a side of the second plate portion in the housing, a sensor panel including a sensor array in which a plurality of sensors for detecting light are arrayed, which is interposed between the scintillator and the first plate portion in the housing, and a member which is interposed between the first plate portion and the sensor panel in the housing, wherein the sensor panel is arranged to position an outer edge of the sensor panel outside an outer edge of the scintillator, and the member is arranged to position an outer edge of the member inside the outer edge of the scintillator.

Further features of the present invention will become apparent from the following description of exemplary embodiments with reference to the attached drawings.

DESCRIPTION OF THE EMBODIMENTS

First Embodiment

Figure 1A:
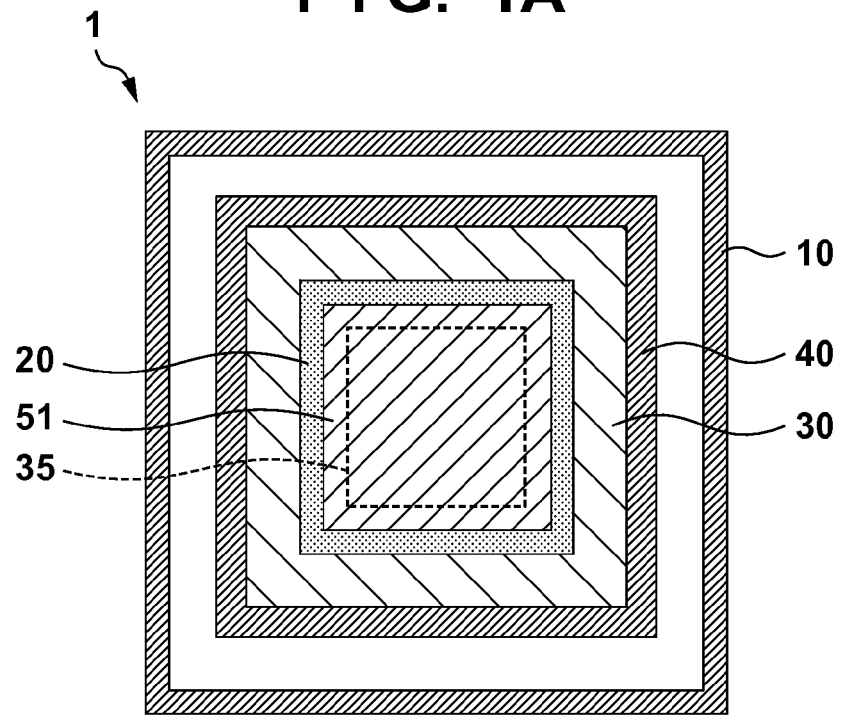
FIGS. 1A and 1B are views for explaining an example of an arrangement according to the first embodiment.
Figure 1B:
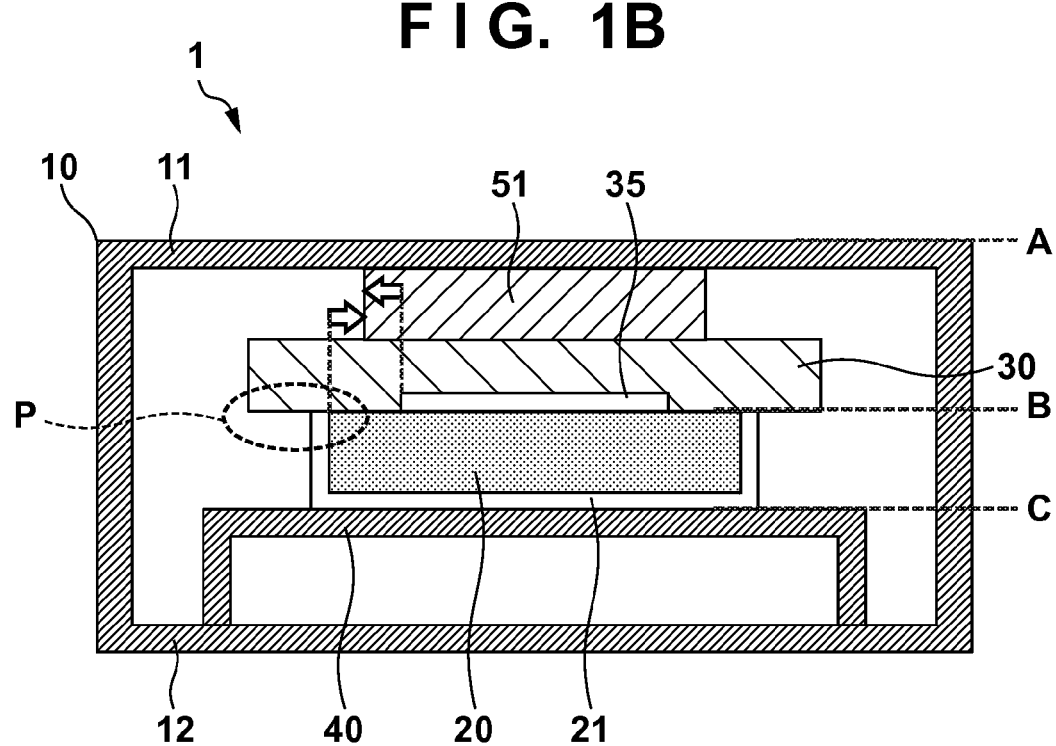

A radiation detection apparatus 1 according to the first embodiment will be explained with reference to FIGS. 1A and 1B. FIG. 1A is a plan view schematically showing the radiation detection apparatus 1. FIG. 1B is a sectional view schematically showing the radiation detection apparatus 1. The radiation detection apparatus 1 can include a housing 10 including a first plate portion 11 and second plate portion 12, a scintillator 20 which converts radiation into light, and a sensor panel 30 including a sensor array 35 in which a plurality of sensors for detecting light are arrayed. The first plate portion 11 and second plate portion 12 are arranged in the housing 10 to face each other. The scintillator 20 can be arranged to be supported by a supporting portion arranged on the side of the second plate portion 12 in the housing 10. The scintillator 20 can be protected by a protection layer 21. The sensor panel 30 can be arranged on a side (plane B side) of the scintillator 20 opposite to a side (plane C side) supported by a supporting portion 40. The radiation detection apparatus 1 can include a member 51 interposed between the first plate portion 11 and the sensor panel 30. The member 51 suffices to use a material having a buffer action of reducing a shock. The member 51 has a buffer function of reducing a shock transmitted to the sensor panel 30 via the first plate portion 11.

The radiation detection apparatus 1 has a back-side irradiation structure. As shown in FIG. 1B, radiation (including an electromagnetic wave such as an X-ray, α-ray, β-ray, or γ-ray) irradiates the first plate portion 11 of the housing 10 from the plane A side. The radiation detection apparatus 1 can be used in, for example, a state in which a subject to be examined (not shown) such as a patient lies down on the first plate portion 11 (the plane A side) of the housing 10. More specifically, radiation containing information of the interior of the body of the subject enters the radiation detection apparatus 1 from the A side, passes through the member 51 and sensor panel 30, enters the scintillator 20, and is converted into light by the scintillator 20. The sensor panel 30 includes the sensor array 35 in which a plurality of sensors (not shown) are arrayed. The sensor panel 30 detects light generated in the scintillator 20, and converts it into an electrical signal. The sensor can use, for example, a PIN photodiode sensor or MIS sensor. Predetermined signal processing for forming a radiation image is performed using the converted electrical signal, thereby obtaining a radiation image representing the state of the interior of the body of the subject. In this manner, radiation imaging is performed.

The sensor panel 30 is arranged to position its outer edge outside that of the scintillator 20. The member 51 is arranged to position its outer edge inside that of the scintillator 20. Also, the member 51 is preferably arranged to position its outer edge outside that of the sensor array 35.

In radiation imaging, for example, when a subject to be examined gets on the radiation detection apparatus 1 and adjusts his body position on the radiation detection apparatus 1, a stress is applied to the radiation detection apparatus 1. The first plate portion 11 can be deformed by a load applied from the A side of the radiation detection apparatus 1. The load from the A side of the radiation detection apparatus 1 is applied to the supporting portion 40 via the first plate portion 11, member 51, sensor panel 30, and scintillator 20.

This stress may be locally applied to the first plate portion 11. If the outer edge of the member 51 is positioned outside that of the scintillator 20, the portion P of the peripheral region of the sensor panel 30 can be damaged. In the structure of the radiation detection apparatus 1, however, the outer edge of the member 51 is positioned inside that of the scintillator 20, and damage to the portion P of the peripheral region of the sensor panel 30 can be prevented. Hence, the structure of the radiation detection apparatus 1 is advantageous for improving the reliability.

Second Embodiment

Figure 2A:
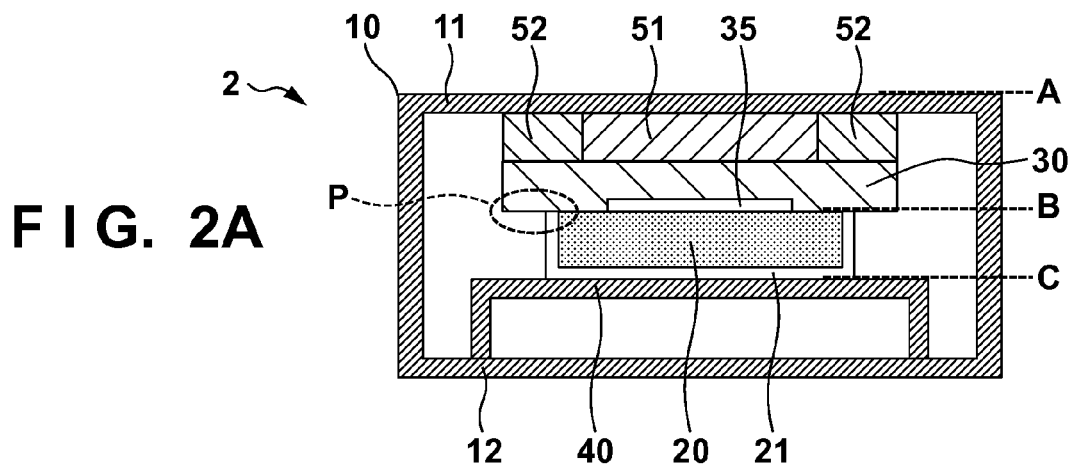
FIGS. 2A to 2C are views for explaining examples of arrangements according to other embodiments.

FIG. 2A schematically shows a radiation detection apparatus 2 according to the second embodiment. In the first embodiment, a space is formed around the member 51 between the first plate portion 11 and the sensor panel 30. In the second embodiment, a second member 52 can be arranged around a member 51. The second member 52 is larger in volume change upon receiving a compressive stress than the member 51. The volume change upon receiving a compressive stress may be determined in accordance with, for example, the rigidity of the member or the like. Since a stress applied to the portion P of the peripheral region of a sensor panel 30 is reduced, damage to the portion P of the peripheral region of the sensor panel 30 can be prevented. Therefore, this arrangement can also obtain the same effects as those in the first embodiment. Similar to the member 51, the second member 52 also has a buffer function of reducing a shock transmitted to the sensor panel 30 via a first plate portion 11.

Third Embodiment

Figure 2B:
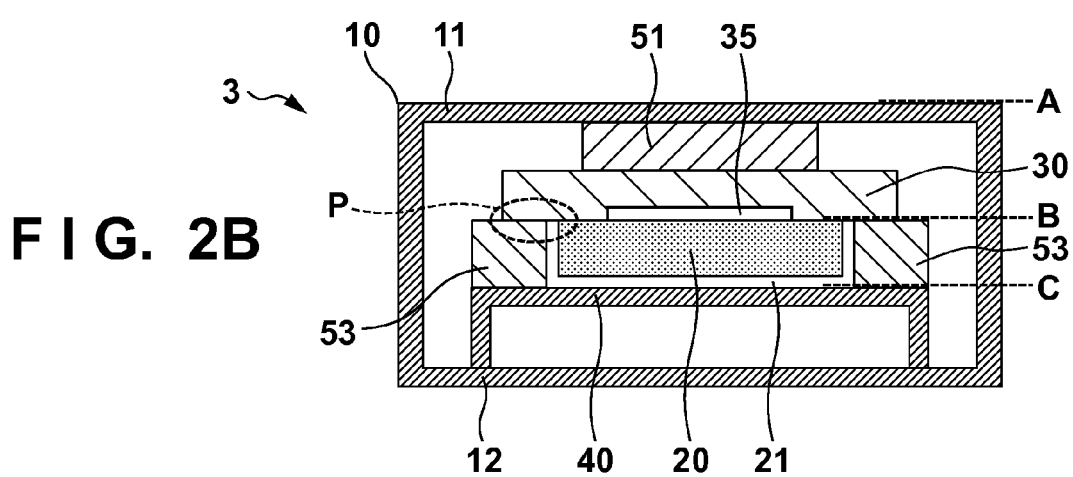

FIG. 2B schematically shows a radiation detection apparatus 3 according to the third embodiment. The third embodiment is different from the first embodiment in that the radiation detection apparatus 3 includes a third member 53 arranged around at least a scintillator 20. It suffices to arrange the third member 53 so as to support a sensor panel 30 from the plane B side. For example, the third member 53 may be arranged to surround the scintillator 20 or be partially arranged in the peripheral region of the scintillator 20. For example, the third member 53 may be arranged on a supporting portion 40, packaged between a first plate portion 11 and a second plate portion 12, or interposed between the supporting portion 40 and the protection layer 21. The third member 53 is larger in volume change upon receiving a compressive stress than a member 51. This arrangement also reduces a stress applied to the portion P of the peripheral region of the sensor panel 30, and obtains the same effects as those in the first and second embodiments. Similar to the member 51, the third member 53 also has a buffer function of reducing a shock transmitted to the sensor panel 30 via the first plate portion 11.

Figure 2C:
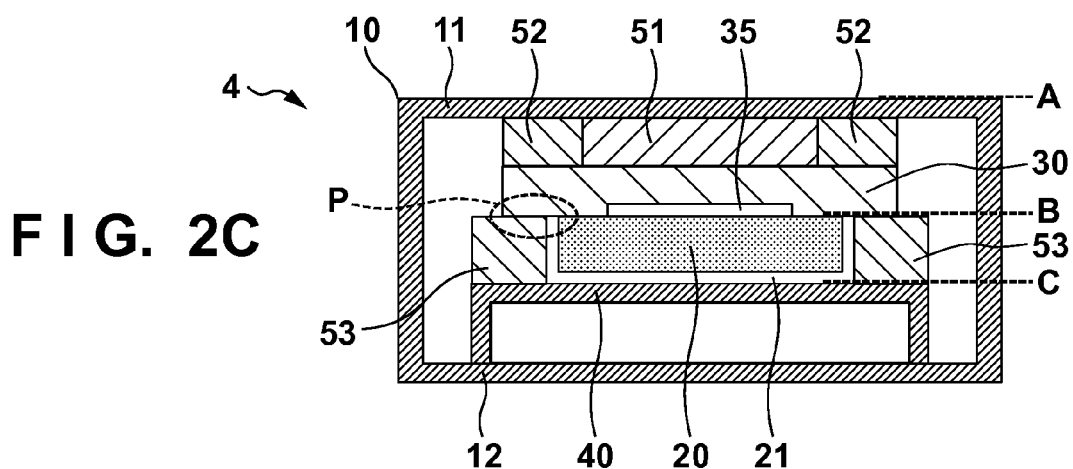
Figure 3:
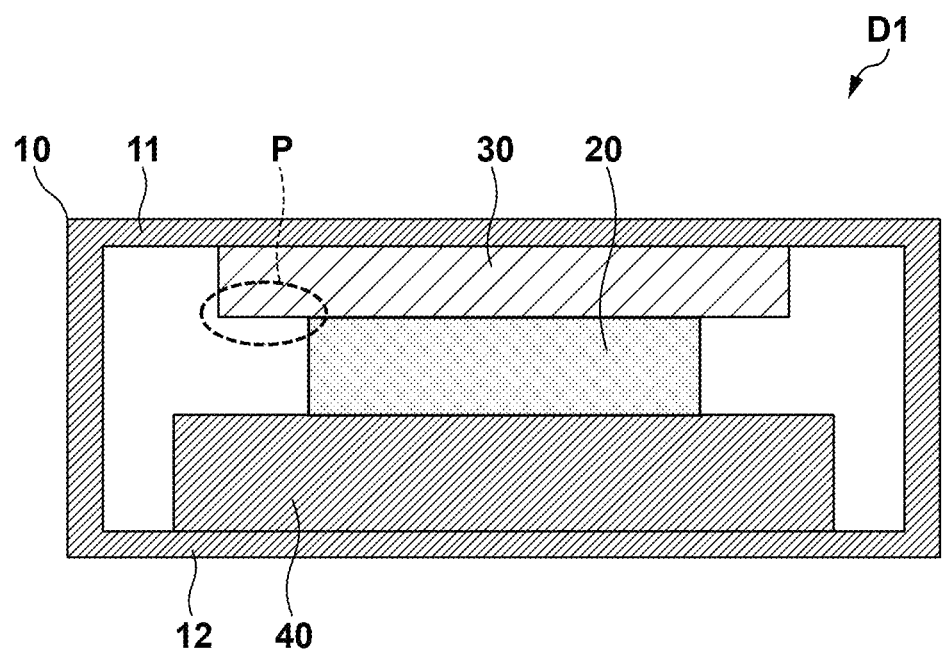
FIG. 3 is a view for explaining a reference example of the arrangement of a radiation detection apparatus.

The three embodiments have been described. However, the present invention is not limited to them, and the purpose, state, application, function, and other specifications can be appropriately changed. The present invention can also be practiced by another embodiment. For example, a radiation detection apparatus 4 having a structure including both the second member 52 and third member 53 may be used, as shown in FIG. 2C.

The above-described radiation detection apparatuses 1 to 4 are applicable to an imaging system. The imaging system includes, for example, the radiation detection apparatus, a signal processor including an image processor and the like, a display unit including a display and the like, and a radiation source for generating radiation. Radiation (a typical example is an X-ray) generated by the radiation source passes through a subject to be examined, and the radiation detection apparatus detects the radiation containing information of the interior of the body of the subject. The radiation detection apparatus generates a radiation image from the detected radiation information. For example, an information processor performs predetermined information processing, generating image data. The display unit displays the image data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-139160, filed Jun. 20, 2012, which is hereby incorporated by reference herein in its entirety.

What is claimed is:

1. A radiation detection apparatus comprising:
    a housing including a first plate portion arranged at an irradiation side and a second plate portion arranged to face said first plate portion;
    a supporting portion arranged in a side of said second plate portion in said housing;
    a scintillator configured to convert radiation into light, which is supported by said supporting portion in said housing;
    a sensor panel, including a sensor array in which a plurality of sensors for detecting light are arrayed, which is interposed between said scintillator and said first plate portion in said housing, with an outer edge of said sensor panel positioned outside an outer edge of said scintillator; and
    a member, having a buffer function of reducing a shock transmitted to said sensor panel via said first plate portion, which is interposed between said first plate portion and said sensor panel in said housing,
    wherein said member is arranged with an outer edge of said member positioned inside the outer edge of said scintillator.

2. The apparatus according to claim 1, wherein said sensor panel includes a first face, on which said sensor array is provided, facing said scintillator, and a second face opposite to the first face, and
    said member is provided between said first plate portion and the second face of said sensor panel.

3. The apparatus according to claim 2, further comprising a second member which is arranged around said member in a region between said first plate portion and the second face of said sensor panel, said second member being larger in volume change upon receiving a compressive stress than said member.

4. The apparatus according to claim 2, wherein a space is formed around said member in a region between said first plate portion and the second face of said sensor panel.

5. The apparatus according to claim 2, further comprising a third member which is arranged around at least said scintillator and between said supporting portion and the first face of said sensor panel, so as to support the first face of said sensor panel from a side of the second plate portion.

6. The apparatus according to claim 5, wherein said third member is arranged to position said outer edge of said third member outside an outer edge of said sensor array.

7. The apparatus according to claim 5, wherein said third member is larger in volume change upon receiving a compressive stress than said member.

8. The apparatus according to claim 1, wherein said supporting portion supports said scintillator via a protection layer, for protecting said scintillator, which is formed so as to cover said scintillator and to contact said sensor panel.

9. The apparatus according to claim 1, wherein said supporting portion is fixed to said second plate portion of said housing.

10. The apparatus according to claim 1, wherein said supporting portion includes a space in a boundary portion between said supporting portion and said second plate portion.

11. The apparatus according to claim 1, wherein said member is arranged to position said outer edge of said member outside an outer edge of said sensor array.

12. An imaging system comprising:
a radiation detection apparatus;
a signal processor which processes a signal from said radiation detection apparatus;
a display unit which displays the signal from said signal processor; and
a radiation source configured to generate radiation,
wherein said radiation detection apparatus comprises:
a housing including a first plate portion arranged at an irradiation side and a second plate portion arranged to face said first plate portion;
a supporting portion arranged in a side of said second plate portion in said housing;
a scintillator configured to convert radiation into light, which is supported by said supporting portion;
a sensor panel, including a sensor array in which a plurality of sensors for detecting light are arrayed, which is interposed between said scintillator and said first plate portion in said housing, with an outer edge of said sensor panel positioned outside an outer edge of said scintillator; and
a member, having a buffer function of reducing a shock transmitted to said sensor panel via said first plate portion, which is interposed between said first plate portion and said sensor panel in said housing,
wherein said member is arranged with an outer edge of said member positioned inside the outer edge of said scintillator.

13. A radiation detection apparatus comprising:
a housing including a first plate portion and a second plate portion which are arranged to face each other;
a supporting portion arranged in a side of said second plate portion in said housing;
a scintillator configured to convert radiation into light, which is supported by said supporting portion in said housing;
a sensor panel, including a sensor array in which a plurality of sensors for detecting light are arrayed, which is interposed between said scintillator and said first plate portion in said housing, with an outer edge of said sensor panel positioned outside an outer edge of said scintillator; and
a buffering system having a buffer function of reducing a shock transmitted to said sensor panel via said first plate portion, said buffering system comprising a member which is interposed between said first plate portion and said sensor panel in said housing, and wherein a totality of said buffering system is located inside said outer edge of said scintillator and outside said outer edge of said sensor array.

14. A radiation detection apparatus comprising:
a housing including a first plate portion arranged at an irradiation side and a second plate portion arranged to face said first plate portion;
a supporting portion arranged in a side of said second plate portion in said housing;
a scintillator configured to convert radiation into light, which is supported by said supporting portion in said housing;
a sensor panel, including a sensor array in which a plurality of sensors for detecting light are arrayed, which is interposed between said scintillator and said first plate portion in said housing, with an outer edge of said sensor panel positioned outside an outer edge of said scintillator; and
a member, having a buffer function of reducing a shock transmitted to said sensor panel via said first plate portion, which is interposed between said first plate portion and said sensor panel in said housing,
wherein, in a view from the irradiation side, said member is arranged so as not to be in contact with part of said sensor panel which is outside the outer edge of said scintillator.

15. The apparatus according to claim 14, wherein
said sensor panel includes a first face, on which said sensor array is provided, facing said scintillator, and a second face opposite to the first face, and
said member is provided between said first plate portion and the second face of said sensor panel, so as not to be in contact with part of the second face of said sensor panel, the part being outside the outer edge of said scintillator in the view from the irradiation side.

16. The apparatus according to claim 15, further comprising a third member which is arranged around at least said scintillator and between said supporting portion and the first face of said sensor panel, so as to support the first face of said sensor panel from a side of the second plate portion.

17. The apparatus according to claim 16, wherein said third member is arranged to position said outer edge of said third member outside an outer edge of said sensor array.

18. The apparatus according to claim 16, wherein said third member is larger in volume change upon receiving a compressive stress than said member.

* * * * *